T. ST. J. B. PARNALL.
AUTOMATIC WEIGHING SCALE.
APPLICATION FILED JULY 29, 1915.
1,173,732.
Patented Feb. 29, 1916.
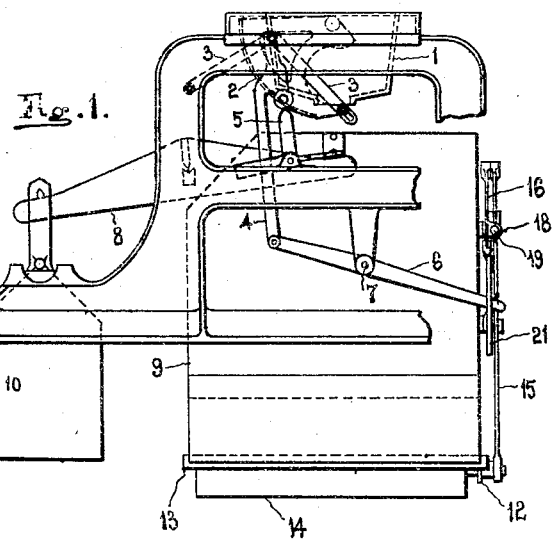
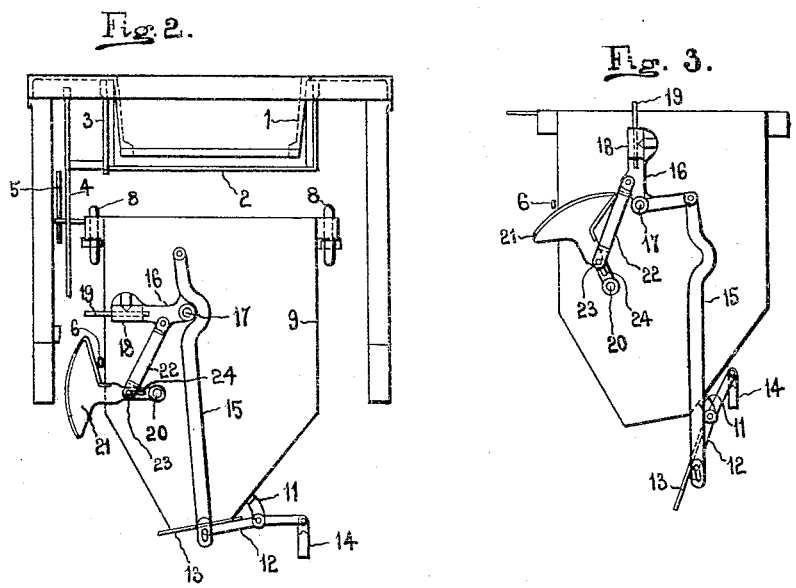
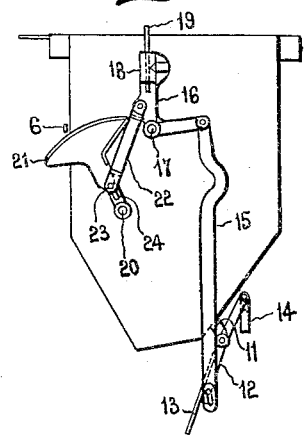
INVENTOR:
THOMAS ST. JULIAN BABINGTON PARNALL
BY:
ATTORNEY.

UNITED STATES PATENT OFFICE.

THOMAS ST. JULIAN BABINGTON PARNALL, OF SMETHWICK, ENGLAND, ASSIGNOR TO W. & T. AVERY, LIMITED, OF SOHO FOUNDRY, SMETHWICK, ENGLAND.

AUTOMATIC WEIGHING-SCALE.

1,173,732.   Specification of Letters Patent.   Patented Feb. 29, 1916.

Application filed July 29, 1915. Serial No. 42,608.

*To all whom it may concern:*

Be it known that I, THOMAS ST. JULIAN BABINGTON PARNALL, a subject of the King of Great Britain, residing at Soho Foundry, Smethwick, in the county of Stafford, England, have invented a new and useful Improvement in Automatic Weighing-Scales; and I do hereby declare the following to be a full, clear, and exact description of the same.

This invention has reference to improvements in automatic weighing scales of the kind employed for weighing granular or similar materials.

The object of the present invention is to improve the construction and operation of the mechanism of an automatic scale of the said kind whereby the operation of the levers connected to the valve controlling the discharge of material from the weigh hopper and the lever governing the operation of the linkage controlling the supply valve are permitted a freer synchronized movement and the sensitiveness or accuracy of the scale thereby enhanced.

My invention is illustrated by the accompanying drawings which show my invention applied to a well-known type of automatic weighing scale, some parts of the mechanism of the scale being omitted or broken off for clearness of reference.

Figure 1 is a side view of an automatic grain scale showing the supply valve in the open position and the weigh hopper discharge valve closed. Fig. 2 is an end view of part of the scale and mechanism seen in Fig. 1, looking on the front of the weigh hopper. Fig. 3 is a front elevation of the weigh hopper separately, but illustrating the position of the mechanism when the weigh hopper discharge valve is open.

The supply of material from the overhead hopper 1 is controlled by the pivoted valve 2 in known manner by means of the toggle links 3, drop bar 4 and trigger 5. The lower end of the drop bar 4 is pivoted in known manner to the "knock-off" lever 6 fulcrumed to the frame of the scale at 7. The weigh beam 8 has suspended thereon at the one end a weigh hopper 9, and at the opposite end a weight box 10, the foregoing construction of an automatic weighing scale and mechanism being well known in the art and not requiring further description as, *per se*, they form no part of the present invention.

Pivotally mounted on a bracket 11 secured to the weigh hopper 9 is a two-armed lever 12 to one arm of which is secured a plate 13 forming the valve controlling the discharge of material from the weigh hopper, and to the other arm of said lever is pivoted a counterweight 14 to overweight the plate 13 and maintain it in the position seen in Figs. 1 and 2 to close the discharge outlet of the weigh hopper.

Pivotally connected to the valve carrying arm of the two armed lever 12 is a lever 15 which in turn is pivoted at its upper end to one arm of a bell-crank lever 16, the bell-crank lever being pivotally mounted on the weigh hopper by means of the pin 17. On the other arm of the bell-crank lever to that to which the lever 15 is pivoted is mounted by means of the boss 18 a bolt 19 adapted to slide in the boss, so that the bolt can be positioned in the path of movement of the free end of the "knock-off" lever 6, or removed therefrom, according as to whether it is desired to make the machine operate automatically or semi-automatically. In the drawings the bolt 19 is shown in the path of the lever 6 and the machine is working automatically. Pivotally connected to the weigh hopper 9 by means of the pin 20 is a cam arm 21. The cam surface at the free end of this arm is designed to allow an initial free upward movement of the end of the lever 6 and a subsequent following movement of the arc part of the cam arm 21 under the free end of the lever 6, the cam arm finally coming to rest at the position seen in Fig. 3. This following movement of the cam arm 21 is transmitted thereto by means of the link 22, pivoted at one end to the one arm of the bell-crank lever 16 and at the other end to the cam arm 21. This pivotal connection of the link 22 to the cam arm 21 may be made by means of a pin 23 and a slot 24 in the cam arm for the purpose of obtaining an initial adjustment of the cam arm and the consequent operation thereof in relation to the movement of the lever 6. By the employment of the said link connection 22 between the bell-crank lever 16 and the cam arm 21 I obtain a means of synchronizing the movements of the bell-crank lever and the cam arm, the cam arm being initially set and designed to permit and follow the movements of the free end of the "knock-off" lever 6, and to control the operation thereof so that only the supply valve or the discharge valve from the weigh hopper can be open at one and the same time.

From the foregoing description of the mechanism it will be readily seen that when the determined supply of material has been delivered to the weigh hopper, the supply valve 2 having closed and the hopper 9 having descended under its load, the free end of the "knock-off" lever 6 will move upward in known manner and assume the position seen by the dotted center-line in Fig. 1. In its upward movement the lever 6 will strike the protruding end of the bolt 19 and throw the bell crank lever 16 about the pin 17 to the position seen in Fig. 3, which permits of the descent of the lever 15 pivoted to the one arm of the bell-crank lever 16 and the opening of the discharge valve. This movement of the bell-crank lever 16 is transmitted to the pivoted link 22, which in turn rocks the cam arm 21 about the pin 20 so as to cause the cam face of the arm to first permit and subsequently to follow the movements of the free end of the lever 6, so that when the cam arm is in its raised position as seen in Fig. 3, it prevents the descent of the lever 6 and consequently insures the supply valve 2 being maintained in its closed position.

When the contents of the weigh hopper have been discharged the valve 13 closes owing to the action of the counterweight 14 and the lever 15 ascends returning the bell-crank lever 16 to the position seen in Fig. 2, causing the bolt 19 to strike the end of the "knock-off" lever 6 and reopen the supply valve, the cam arm being returned to its lowered position through the pivoted link 22, thus removing the cam arm from the downward path of the lever 6.

The herein described improved construction of the pivoted cam arm and the means for operably connecting the said arm with the mechanism for controlling the discharge valve of the weigh hopper permit of a ready application *in situ* of my improved mechanism to existing scales of the said type without material alteration.

What I claim is:—

In an automatic weighing scale, the combination of a valve controlling the supply of material, a linkage controlling the operation of said valve, a lever 6 adapted to control said linkage, a weigh beam upon which is suspended a weigh hopper, a valve controlling the discharge outlet of said weigh hopper, a lever pivotally connected to said discharge valve, a bell-crank lever adapted to rock about a pivot on the weigh hopper one arm of said bell-crank lever being pivotally connected to the discharge valve lever, a cam arm pivoted on said weigh hopper for controlling the operation of the lever 6, and a lever pivoted to the cam arm and to one arm of the bell-crank lever for synchronizing the operations of the bell-crank lever and the cam arm.

In testimony whereof, I have signed my name to this specification in the presence of two subscribing witnesses.

THOMAS ST. JULIAN BABINGTON PARNALL.

Witnesses:
 GEORGE E. FOLKES,
 NORMAN S. BARLOW.

Copies of this patent may be obtained for five cents each, by addressing the "Commissioner of Patents, Washington, D. C."